UNITED STATES PATENT OFFICE.

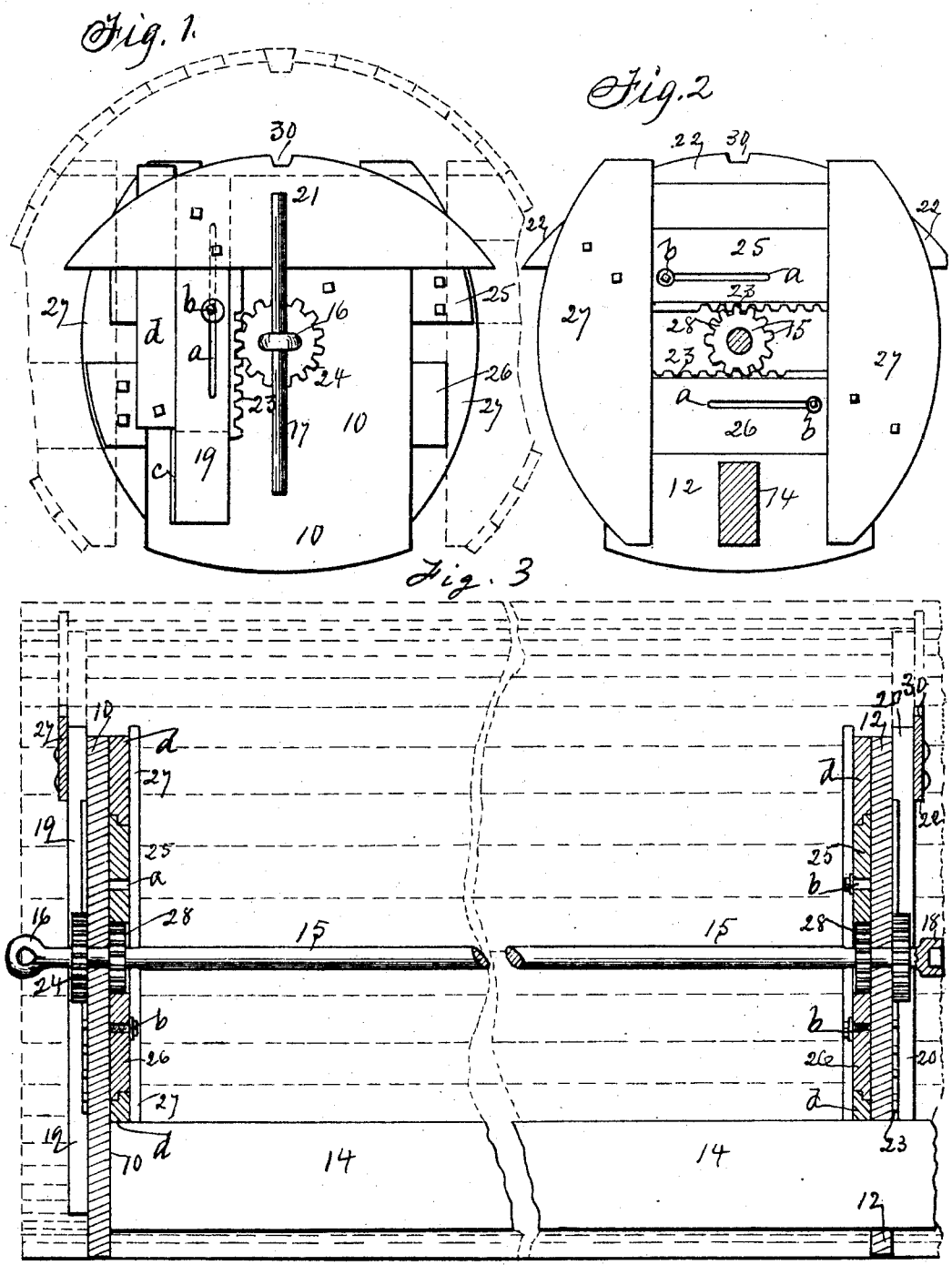

HENRY NOAH, OF BAXTER, IOWA.

METHOD AND APPARATUS FOR MAKING CULVERTS OF CONCRETE.

No. 929,694.          Specification of Letters Patent.          Patented Aug. 3, 1909.

Application filed October 26, 1908. Serial No. 459,943.

*To all whom it may concern:*

Be it known that I, HENRY NOAH, a citizen of the United States, residing at Baxter, in the county of Jasper and State of Iowa, have invented a new and useful Method and Apparatus for Making Culverts of Concrete, of which the following is a specification.

The object of my invention is to lessen the labor and reduce the cost of building a culvert or sewer complete in one piece from end to end from concrete and vary in diameter and length as desired.

My invention consists in the use of the method and apparatus as hereinafter set forth, pointed out in my claims and illustrated in the accompanying drawings in which:

Figure 1 is an end view of the apparatus adapted to be extended longitudinally in a ditch or on the ground where a culvert or sewer is to be constructed. Fig. 2 is a face view of an extension of the apparatus at some distance from the end as required in combination with what is shown in Fig. 1 for supporting the cylindrical cover that is required for producing a mold around which the concrete is to be placed and tamped. Fig. 3 is a longitudinal sectional view of the apparatus and shows the manner of combining the parts extending transversely and longitudinally as required to produce molds that may vary in diameter and length.

The numeral 10 designates the main portion of the outer end of the apparatus in the form of a flat plate, preferably cast iron. A corresponding plate 12 is shown in Fig. 2 and Fig. 3 shows the two plates 10 and 12 rigidly connected by a wooden reach 14, as required to produce one section or length of the apparatus that may vary in length and diameter as desired. A portable shaft 15 extends through bearings in the center of the plates 10 and 12 and has an eye 16 at its outer end for detachably connecting an operating bar 17 therewith as shown in Fig. 1 and as required for rotating the shaft. At the inner end of the shaft is a socket 18 for connecting an extension of the shaft and increasing the length of the apparatus by adding another section whenever desired.

On the outside faces of the plates 10 and 12 are movable uprights 19 and 20 and fixed across the tops of said uprights are segments 21 and 22. The uprights have slots *a* and studs *b* fixed to the plates 10 and 12 that project through said slots and serve as guides for keeping the uprights 20 perpendicular. The outer edges of the uprights have bearings *c* that engage bearers *d* fixed to the plates 10 and 12 and the inner edges of said uprights have fixed racks 23 that are engaged by gear wheels 24 fixed to the shaft 15 in such a manner that rotating the shaft will cause the segments 20 and 22 to be moved upward and downward as required for enlarging and diminishing the diameter of the mold at pleasure.

To the plates 10 and 12 are connected movable parts 25 and 26 that have fixed segments 27 to be moved in and out in horizontal planes in opposite direction simultaneously in the manner that the segments 21 and 22 are moved vertically by means of the shaft 15 having gear wheels 28 to engage the racks 23 as shown in Figs. 2 and 3 for enlarging and contracting the diameter of the mold as indicated by dotted lines in Figs. 1 and 2.

When a section or a plurality of sections of my apparatus are located on the ground or in a ditch where a culvert or sewer is to be constructed and the segments 21 and 27 adjusted as required to produce the diameter of the structure desired a layer of concrete is first placed on the ground upon which to rest the apparatus and to produce the bottom of the structure. Boards are then placed against the edges of the lower portions of said segments and concrete fitted against them and tamped. More boards are successively thus placed as indicated by dotted lines in Figs. 1 and 2, until the apex of the segments 21 and 22 is reached in the making of the concrete structure. A key 29 corresponding in length with the apparatus is then placed in notches 30 in said segments and concrete placed on top as required for finishing the structure complete in one piece. After the concrete thus placed and tamped is dry and hard the boards supported on the segments 21, 22 and 27 can be released by rotating the shaft 15 as required to draw inward said segments so that said boards can be readily drawn out of the concrete structure and the complete apparatus removed and placed in position as may be required for extending a sewer by a continuous section added thereto by the same method that the first section was made.

Having thus set forth the construction of my apparatus and the manner of using, the practical operation and advantages of my invention will be readily understood.

What I claim as new and desire to secure by Letters-Patent, is:

1. In an apparatus for making culverts and the like from concrete complete in one length, two plates rigidly connected at their lower portions to be retained at some distance apart, a rotatable shaft mounted in bearings at the centers of said plates, uprights slidably connected with said plates, segments adjustably connected with the upper ends of said uprights and means for moving said uprights up and down for enlarging the diameter of the culvert as set forth.

2. In an apparatus for making culverts and the like from concrete complete in one length, two plates rigidly connected at their lower portions to be retained at some distance apart, a rotatable shaft mounted in bearings at the centers of said plates, uprights slidably connected with said plates, segments adjustably connected with the upper ends of said uprights, racks fixed to the uprights and gear wheels fixed to the shaft to engage the racks, for moving said uprights up and down for enlarging the diameter of the culvert arranged and combined to operate as set forth.

3. In an apparatus for making culverts and the like from concrete, a plate on a rotatable shaft, a rotatable shaft having a fixed gear wheel, an upright having a rack at one edge and a bearing at its other edge, a fixed bearer on the plate to engage the bearing at one edge of the upright, a slot in the upright and a stud on the plate extended through said slot as set forth.

4. In an apparatus for making culverts and the like, a plate having two slides or bars and fixed segments at their outer ends, a rotatable shaft in a bearing at the center of the plate, a fixed pinion on the shaft, racks on the edges of said slidable bars to engage said pinion and means to rotate said shaft to operate as set forth.

5. An apparatus and method of operating it for constructing a culvert or the like complete in one length, comprising two plates, a reach rigidly connecting the two plates, upright slides having fixed segments at their upper ends, a rotatable shaft in bearings in the two plates, gear wheels fixed on the shaft to engage the racks on the uprights, means to retain the uprights perpendicular, slidable bars in horizontal bearings fixed to the said plates, segments fixed to the outer end of said slidable bars, racks on the edges of the slidable bars, a pinion on the rotatable shaft to engage said racks for moving the slidable bars simultaneously in reverse ways and a plurality of boards placed on the segments to produce a cylindrical mold in the manner set forth for the purposes stated.

HENRY NOAH.

Witnesses:
W. T. THORP,
CASPAR SCHMIDT.